April 3, 1956     E. P. WRIGHT     2,740,501

RAILWAY BRAKE BEAM STRUCTURE

Filed Aug. 23, 1954

INVENTOR.
Edward P. Wright
BY Rodney Bedell
atty.

United States Patent Office 2,740,501
Patented Apr. 3, 1956

2,740,501
RAILWAY BRAKE BEAM STRUCTURE
Edward Paul Wright, Glendale, Calif.
Application August 23, 1954, Serial No. 451,591
7 Claims. (Cl. 188—222.1)

The invention relates to railway brake beams of the type in which a brake head is mounted on the ends of the beam main members and is subject to thrust by the beam main members in a direction transversely of its length as the brakes are applied and released.

It is difficult to provide an accurate fit between a brake head and a beam main member upon which it is mounted because the parts are not machined for assembly and are subject to manufacturing variations due to rolling mill tolerances and casting irregularities. The main object of the invention is to facilitate a close fit between the brake head and the beam member upon which it is mounted and thereby avoid play between these parts as originally assembled or looseness arising from repeated application and release of the brakes.

The invention consists in the provision of relatively small elements on the brake head initially projecting into the space occupied by the brake beam main member when the head is assembled therewith and deformed by the mounting of the head so that the beam main member and head have interengaging contact over substantial areas at opposite sides of the beam main member.

In the accompanying drawing illustrating the invention,

Figure 1:
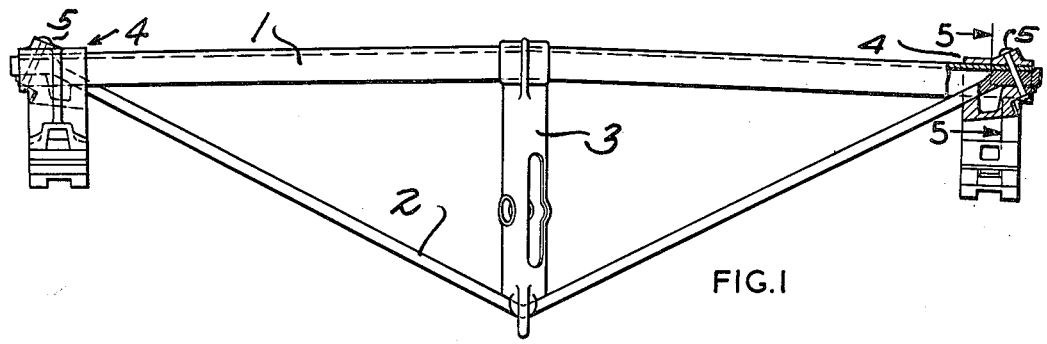
Figure 1 is a top view of a typical railway truss type brake beam, one end being sectioned through the middle horizontal plane of the beam.
Figure 2:
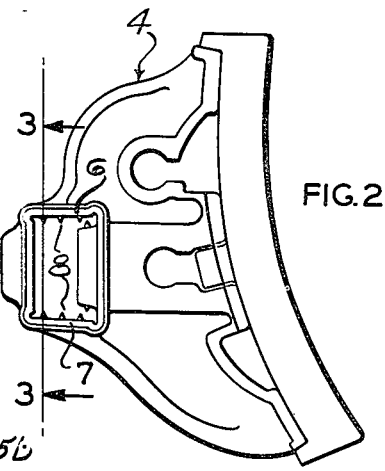
Figure 2 is a side view of the head and is drawn to a larger scale than Figure 1.

The brake beam shown in Figure 1 has a compression member 1 of channel-like cross section, a tension rod 2, a strut 3, and brake heads 4 secured to the beam main members 1 and 2 by rivets 5.

Figure 3:
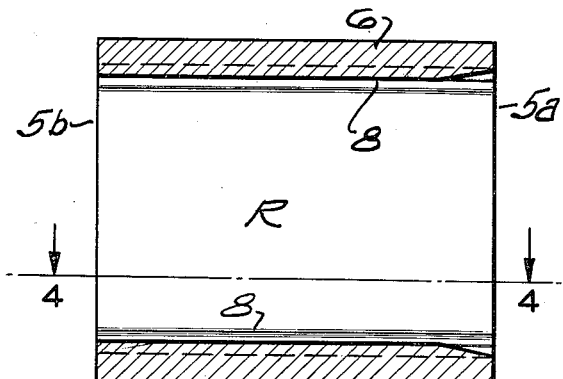
Figure 3 is a vertical section taken on the line 3—3 of Figure 2 and drawn to a larger scale.
Figure 4:
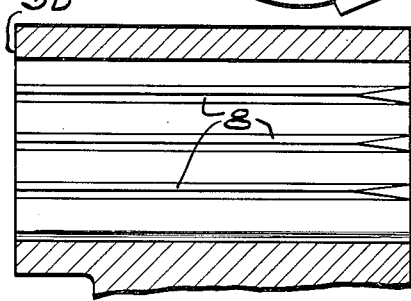
Figure 4 is a horizontal section taken on the line 4—4 of Figure 3.

The parts of this beam correspond to those in general use except that the opposing faces of the head top wall 6 and bottom wall 7 are provided with narrow ribs or beads 8 extending lengthwise of the head recess R into which the beam member 1 is inserted. Ribs 8 are shown as of triangular cross section and tapering from the head wall into the recess. Figures 3 and 4 indicate that the ribs taper also from the inner face 5a of the head towards the outer face 5b of the head.

When head 4 and beam compression member 1 are assembled the end of member 1 will deflect or scrape off the edges of ribs 8 as the channel is inserted into the head recess and thus deform the ribs and result in a pressed fit between head walls 6 and 7 and the top and bottom faces of compression member channel 1.

Figures 5, 6:
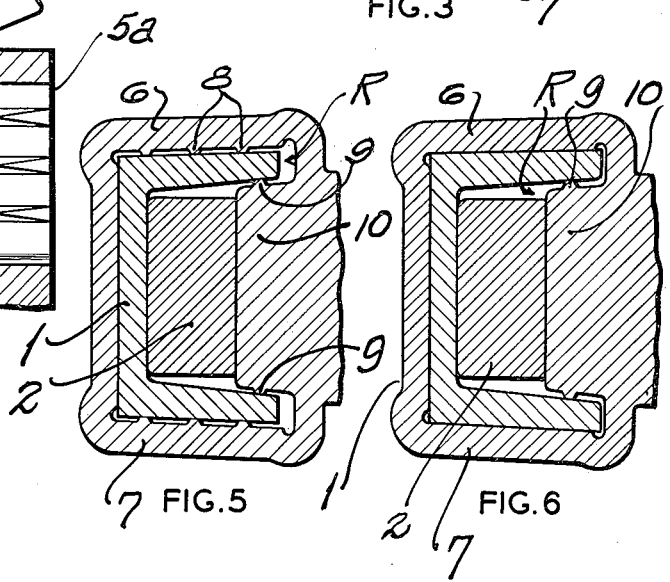
Figure 5 is a vertical section taken on the line 5—5 of Figure 1 and showing the head assembled with a beam compression member, the depth of the head recess being substantially greater than the depth of the beam compression member.
Figure 6 is a corresponding section but showing a minimum clearance between the head and beam compression member.

Figure 5 shows additional ribs 9 on the portion 10 of the head, which projects between the channel flanges, and ribs 9 provide additional bearings between the head and the channel.

Figure 7:
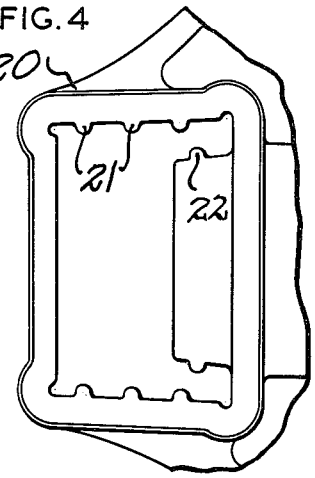
Figure 7 is a detail side view of a brake head as shown in Figure 2 but drawn to an enlarged scale and illustrating another form of the invention.

Figure 7 shows a head 20 in which the ribs 21 and 22 are of rounded contour and will provide additional contact area between the head and the inserted compression member.

It will be understood that additional or shorter or differently shaped ribs or beads or beams of different cross sections could be substituted for those shown and the details of the deformed element contacts may be varied otherwise without departing from the spirit of the invention and the exclusive use of those modifications coming within the scope of the claims is contemplated.

What is claimed is:

1. A railway brake head having a recess with opposing walls adapted to receive between them a brake beam main member, at least one of said walls having a relatively narrow projection extending into the recess and adapted to be deformed by the insertion into the recess of a member substantially fitting in the same.

2. A railway brake head having an elongated recess adapted to receive a brake beam, at least one of the walls of said recess having a narrow rib-like projection elongated lengthwise of the recess and extending into the recess and adapted to be engaged and deformed by the insertion into the recess of a beam main member substantially but not quite filling the recess.

3. A railway brake head having an elongated recess adapted to receive a brake beam, at least one of the walls of said recess having a plurality of rib-like projections elongated lengthwise of the recess and spaced apart transversely of the recess and adapted to be engaged and deformed by the insertion into the recess of a beam main member substantially but not quite filling the recess.

4. A railway brake head having a recess adapted to receive a beam main member, the opposing walls of said recess being provided with narrow projections near the ends of the recess and intermediate the ends of the recess and extending towards each other into the recess and being deformable by a member thrust into the recess and substantially fitting therein.

5. A railway brake head having an elongated recess adapted to receive a brake beam, there being elongated ribs on opposing walls of said recess extending lengthwise thereof and tapered in thickness from the respective wall inwardly of the recess and being tapered in height from a point between the ends of the recess towards one of said ends, said ribs being engageable and deformable, at least in part, by the insertion into the recess of a beam to which the head is applied.

6. In a railway brake beam, a brake head having an elongated recess with opposing walls facing transversely of the length of the beam, relatively narrow ribs projecting from at least one of said walls and running lengthwise of the beam, and a brake beam main member inserted into said recess and having a dimension perpendicular to said wall exceeding the normal distances between the innermost edges of said ribs and an opposing wall of said recess, said ribs being deformed by the member.

7. In a railway brake beam, a brake head having an elongated passage from side to side and of generally rectangular cross section, there being elongated ribs extending lengthwise of said recess and each tapered in cross section from a respective wall into the recess, and a beam main member of channel cross section having a pressed fit in said recess and flattening the tapered edges of said ribs.

References Cited in the file of this patent

UNITED STATES PATENTS

| | | |
|---|---|---|
| 1,157,666 | Bennett | Oct. 26, 1915 |
| 2,049,536 | De Long | Aug. 4, 1936 |
| 2,636,254 | Gunning | Apr. 28, 1953 |